Jan. 23, 1968   K. G. SATTLER   3,364,797

SAW BLADE SHARPENING FIXTURE

Filed June 6, 1966   3 Sheets-Sheet 1

INVENTOR
KENNETH G. SATTLER
BY
Salvatore G. Militana,
Attorney

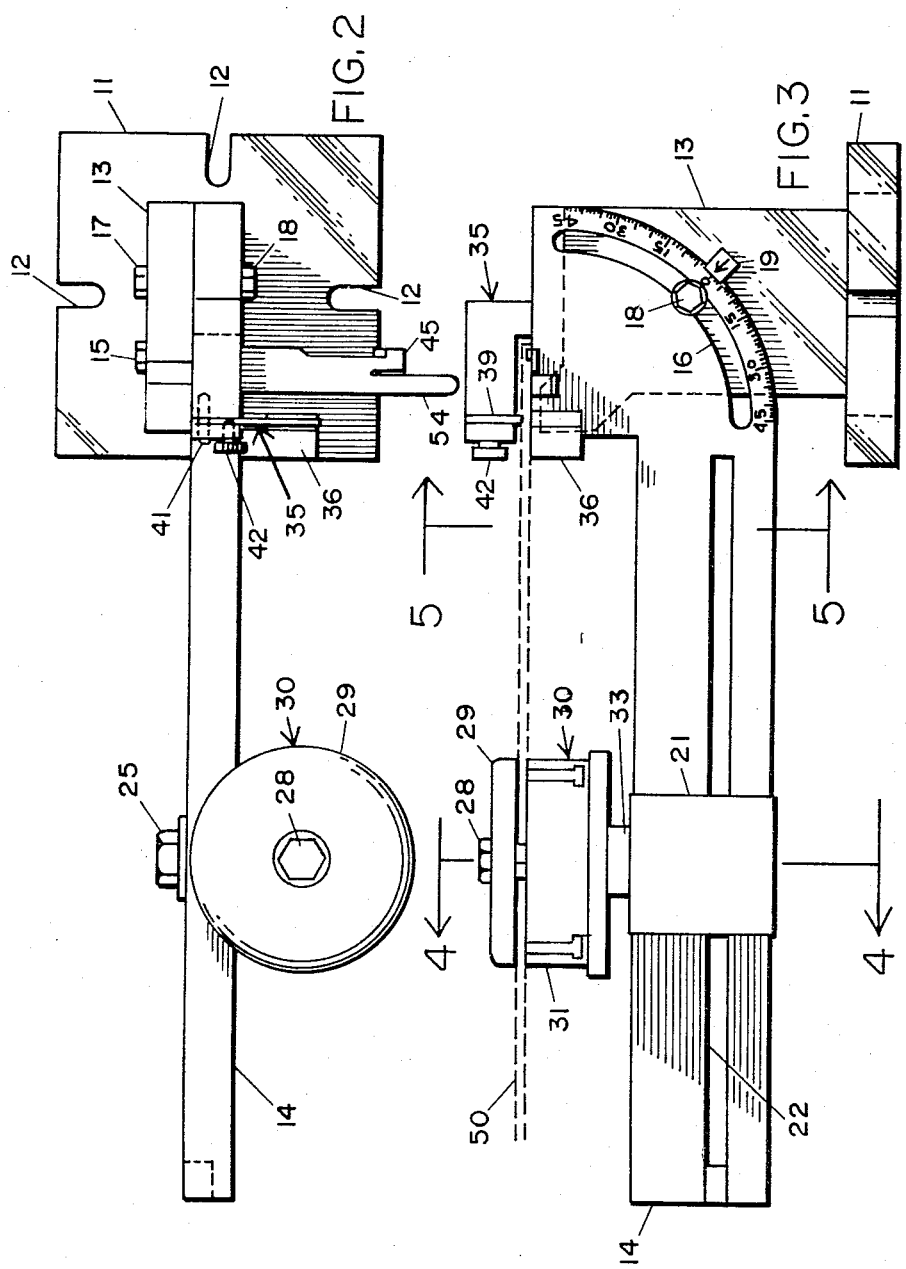

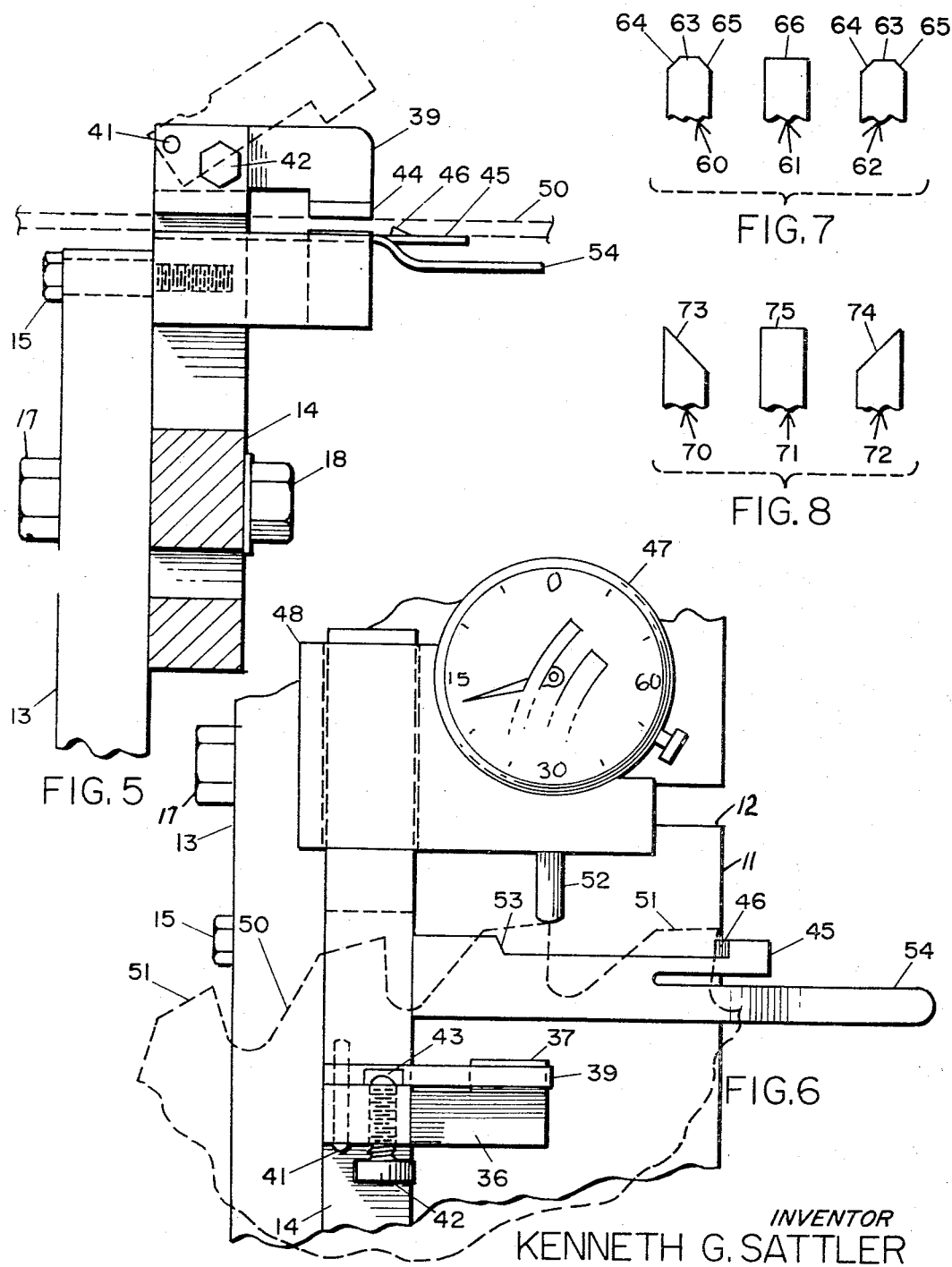

3,364,797
SAW BLADE SHARPENING FIXTURE
Kenneth G. Sattler, 1356 W. 76th St.,
Hialeah, Fla. 33012
Filed June 6, 1966, Ser. No. 555,537
4 Claims. (Cl. 76—79)

This invention relates to saw blade sharpening fixtures and is more particularly directed to a fixture for sharpening carbide tipped saw blades.

In the conventional carbide saw blade sharpening fixtures there are two serious problems, the first of which results in the blade being improperly sharpened and the second in the expenditure of considerable time in swinging the blade holding component of the fixture from one angle to another in that the fixture and grinding head must be reset each time the angle of the saw blade has to be adjusted. The present invention contemplates providing the fixture of the instant application with means for straightening out a warped saw blade as it is being ground and for holding or gripping the saw blade securely in proximity of the teeth where the grinding operation is taking place whereby the saw becomes properly sharpened. Also, by placing the pivoting pin of the blade holding arm in approximately axial alignment with the tooth at the position of the grinding action, movement of the position of the blade holding arm will not move the teeth being ground out of the area of the grinding operation and therefore does not have to be reset when once in proper position.

Therefore, a principal object of the present invention is to provide a carbide saw blade sharpening fixture which does not remove the teeth of the saw being sharpened from the position of the grinding operation upon changing the angle of the arm with relation to the grinding wheel, and therefore does not ever have to be reset when once set.

Another object of the present invention is to provide a carbide saw blade sharpening fixture which permits the sharpening of a blade properly by means of a blade gripping member that engages the blade in close proximity to the teeth during the grinding operation.

A further object of the present invention is to provide a carbide saw blade sharpening fixture with a scroll chuck having a cap member that holds a blade firmly on the scroll chuck and straightens out any warping in the blade during the sharpening operation.

A still further object of the present invention is to provide a carbide saw blade sharpening fixture which is simple in design, inexpensive in cost and most effective to sharpen a saw blade properly and quickly thereby reducing the cost of sharpening a saw blade as well as accomplishing the sharpening of a saw blade in a minimum of time.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 2 is a top plan view with the dial indicator not shown.

FIGURE 3 is a side elevational view showing a saw blade in dotted lines.

FIGURE 5 is a fragmentary cross sectional view taken along the line 5—5 of FIGURE 3 showing a saw blade in dotted lines.

FIGURE 6 is a fragmentary plan view showing the operation of the dial indicator with the saw blade shown in dotted lines.

FIGURE 7 is a diagrammatic view of three teeth illustrating a saw blade.

FIGURE 8 is a similar view illustrating an alternate saw blade.

Figure 1:
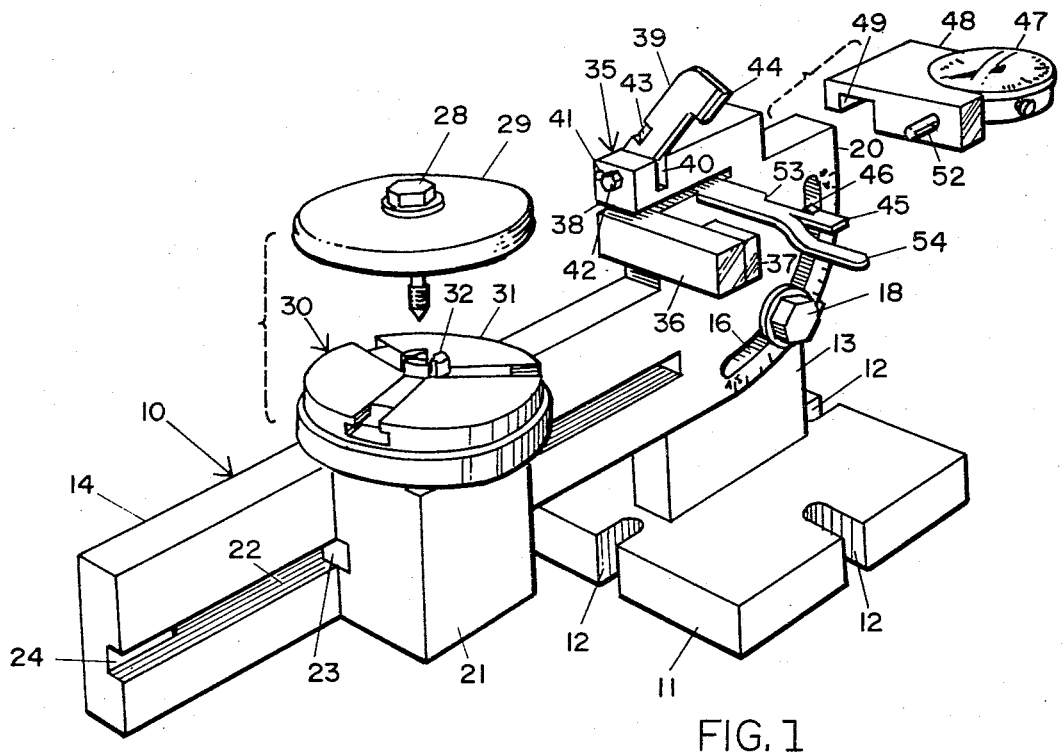
FIGURE 1 is a perspective view of my saw blade sharpening fixture showing a dial indicator and a scroll chuck cover in exploded position.
Figure 4:
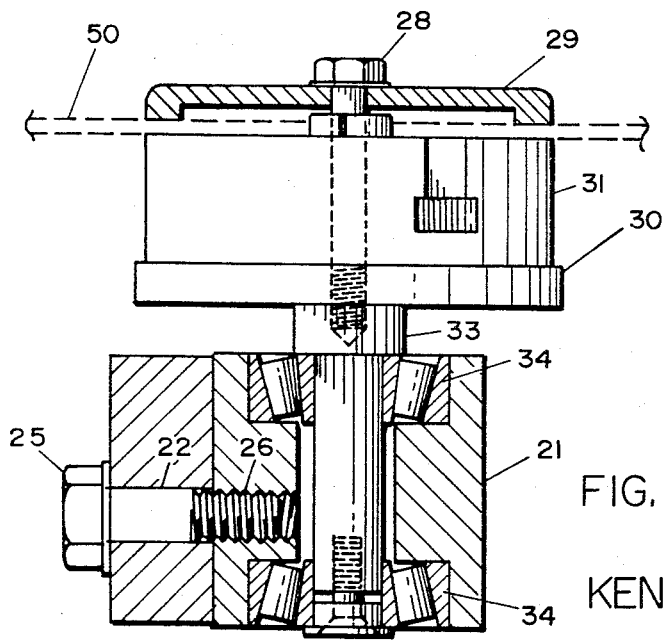
FIGURE 4 is a cross sectional view taken along the line 4—4 of FIGURE 3 showing a saw blade in dotted lines.

Referring to the drawings wherein like numerals are used to designate similar parts throughout the several views, the numeral 10 refers to a saw blade sharpening fixture constructed in accordance with my invention and consisting of a base plate 11 which is provided with peripheral slots 12 for receiving hold down bolts (not shown) for fastening the fixture 10 to a grinding machine when a saw blade is being sharpened. Mounted on the base plate 11 is an upright support member 13 on which a saw blade support arm 14 is pivotally mounted as by a shoulder pivot pin 15 permitting the arm 14 to pivot in a vertical plane. The arm 14 is provided with an arcuate slot 16 at its pivoted end portion 20 through which slot a bolt 17 fastened to the upright support member 13 extends. Graduations in degrees from zero to 45 degrees in either side of the zero are imprinted adjacent to the arcuate slot 16 with a pointer 19 mounted on the support 13 indicating the reference point. The arm 14 may be locked in any desired angle with relation to the support 13 by means of a nut 18 mounted on the bolt 17.

Along approximately the full length of the arm 14 is a slot 22 which receives a key 23 mounted on the side wall of a base member 21 of a conventional scroll chuck 30. The slot 22 extends through the full width of the arm 14 except for a short distance from the free end of the arm 14 as at 24. A bolt 25 is slidably mounted along the slot 22 having its threaded end received in a threaded bore 26 in the base member 21 of the scroll chuck 30. Upon tightening the adjustment bolt 25 at any position of the scroll chuck 30 on the arm 14, the scroll chuck 30 will remain in that selected position until the bolt 25 is loosened and the scroll chuck 30 moved along the arm 14. It is in this manner that saw blades of different diameters can be accommodated thereon.

Rotatably mounted on the base member 21 is a saw blade holder 31 having an adjustable chuck 32 which may be adjusted to the size of a saw blade bore and holds the saw blade securely on the chuck 30. A shaft 33 is rotatably mounted in bearing races 34 which is secured to the base member 21. When a cap member 29 has been fastened by a hand turned bolt 28 into place on a saw blade 50 positioned on the scroll chuck, the saw blade 50 will not only be held most securely while being sharpened but any warping in the saw blade will be corrected so that saw blade will be sharpened properly.

At the pivoted end 20 of the arm 14 above the support member 13 is a saw blade gripping device 35 consisting of a blade support member 36 that lies in the same plane as the top surface of blade holder 31 of the chuck 30 so that the saw blade 50 positioned on the chuck 30 will lie and be supported properly on the blade support member 36 adjacent the teeth 51 of the saw blade 50. A carbide tip member 37 welded to the support 36 prevents undue wear of the blade support 36. A slot 38 formed in the gripping device 35 receives the toothed edge portion of the saw blade 50. A gripping member 39 pivoted in a transversely disposed slot 40 by a pivot pin 41 may be locked in its saw blade gripping position by a lock bolt 42. The lock bolt 42 engages a groove 43 formed in the top edge of the gripping lever 39 to lock the lever 39 against turning at which time the carbide tip member 44 engages the top surface of the saw blade 50 in proximity of the teeth 51 to hold and support the saw blade 50 securely during the grinding operation as explained hereinafter.

Lying in the same horizontal plane as the chuck 30 and the blade support member 36 is a flexible indexing member 45 having one end secured to saw-blade gripping device 35 at the position of the slot 38. The indexing member 45 which engages the lower surface of the saw blade 50 very lightly is provided with an inclined shoulder or stop member 46 made of carbide material. The stop member 46 is inclined in a direction to permit the teeth 51 of the saw blade 50 to slide upwardly thereon as the saw blade 50 is rotated counter-clockwise as viewed in FIGURE 6 but will prevent the saw blade 50 from rotating clockwise. However, in order to permit the saw blade 50 to be rotated clockwise, in the event the blade has been inadvertently rotated beyond the desired position, to be sharpened the indexing member 45 is provided with a downwardly extending extension 54. Upon applying a downward force on the extension 54, the shoulder 46 will be depressed below the level of the teeth 51 thereby releasing the tooth 51 and permitting the saw blade 50 to be rotated clockwise. During a blade sharpening operation wherein alternate teeth are being sharpened in one setting of the fixture 10, the operator rotates the blade 50 with one hand and listens for a clicking noise caused by the release of the inclined stop or shoulder 46 as the teeth 51 slides off the shoulder 46 and strikes the member 45. The indexing member 45 is slotted as at 53 along one edge to prevent the teeth 51 from rubbing against the member 45 as the saw blade 50 is rotated.

Upon sharpening a circular saw blade, the radii of the saw blade at the teeth will have been altered inasmuch as a certain amount of metal has been ground off the teeth. In those instances wherein teeth have bevelled faces extending in opposite directions, a dial indicator must be utilized to determine the amount of metal to be ground off the bevelled face after the first set of bevelled teeth have been ground in order that the teeth will have the same radii. Also if certain teeth are shorter than other teeth on a saw blade the dial indicator must be used.

As best shown by FIGURES 1 and 6, a conventional dial indicator 47 is shown mounted on a slide bracket 48 which is provided with a slot 49 for mounting the dial indicator 47 in operating position on the pivoted end 20 of the arm 14. The dial indicator 47 is provided with the usual stem 52 whose reciprocal movement actuates the pointer of the dial indicator.

In the normal operation of my saw blade sharpening fixture 10, the saw blade 50 to be sharpened is placed on the scroll chuck 30 with the chuck 32 being received by the center bore of the saw blade. The chuck 32 is then drawn backwards thereby holding the saw blade 50 securely during the sharpening operation. However, if the saw blade 50 is warped, then the cover member 29 is fastened into position on the chuck 30. After the bolt 25 is loosened the chuck 30 is then slid along the arm 14 until the saw blade 50 is resting on the blade support member 36 and the indexing member 45 while one of the teeth 51 of the saw blade 50 is engaged by the stop member 46. The outside diameter of the tooth to be ground is now in position beyond the indexing member 45 to be engaged by a grinding wheel which will be positioned in close proximity to the indexing member 45. The bolt 25 is then tightened and the blade engaging member 39 is pivoted about its pivot pin 41 to compel the tip 44 to engage the saw blade 50. The bolt 42 is then tightened to lock the member 39 against the top surface of the saw blade 50 so that the latter is held securely as the teeth 51 are being ground and sharpened.

The grinding operation in the sharpening of each of the teeth 51 of the saw 50 is then begun. If there is a chamfer or a bevel in the tooth to be sharpened, then the bolt 18 is loosened and the arm swung in a vertical plane to the arc desired as indicated by the number of degrees shown by the graduations adjacent the slot 16. The bolt 18 is then tightened to secure the arm 14 in position. It is to be noted that the saw blade 50 lies in a horizontal plane common to the pivot pin 15 of the arm 14 and the pivot pin 15 is also in alignment with the indexing member 45. Consequently when the arm 14 has to be adjusted during the sharpening of the teeth of a saw blade from one position to a second position, the second position of the teeth will be in extremely close proximity to the first position which in turn is the proper position for grinding. No effort or lost time is involved in bringing the saw to its second position of grinding after the first grinding action has been completed.

As for example, FIGURES 7 and 8 show in a diagrammatic fashion teeth of two different saws. The teeth 60, 61 and 62 are teeth of a saw in which the order of the teeth about the periphery of the saw is as shown. With the saw illustrated by FIGURE 7, after the saw has been positioned on my fixture 10, the cutting surfaces 63 of all saw teeth 60 and 62 are first ground. Then the surfaces 66 of the alternating teeth 61 are ground without the necessity of making any adjustment of my fixture 10 except that if the teeth 66 are to be .015 inch shorter in radius than that of the teeth 60, 62, then the grinder hand wheel is moved the distance of .015 inch in the direction of a deeper cut. The next step consists of pivoting the arm 14 to the angle at which the chamfers 64 are with relation to the side edge of the teeth. After the chamfers 64 have been ground, the arm 14 is then swung to the same angle on the other side of the zero marking on the angle setting. The chamfers 65 are then ground thereby completing the grinding of the saw.

In the conventional fixtures for sharpening the teeth of saw blades, when the fixture is being changed from the position of having grinding the chamfers 64 to that of grinding the chamfers 65, a great deal of effort and time is expended in the adjustment of the grinding tool to its original grinding position. The conventional fixture has its blade support member mounted above the pivot point of the fixture. Consequently when the fixture is swung from one position to another, the teeth circumscribe a large arc moving the teeth from the grinding position near the grinding tool to a position remote therefrom. The grinding tool must then be moved back into position to grind the teeth at their remote position.

In sharpening the teeth of a saw illustrated by the teeth 70, 71 and 72 in FIGURE 8, the fixture 10 will be adjusted to first grind the bevel surface 73 of the teeth 70 by swinging the arm 14 to the proper angle. After all of the teeth 70 are ground then the arm 14 of the fixture 10 is swung to the same angle in the other side of the zero reading and the bevel 74 is begun to be ground. However, since these teeth 70 and 72 must be of equal distance from the center of the saw blade, the dial indicator 47 is used to determine when sufficient metal has been ground on the bevelled surface 74 of the tooth 72. Then all of the teeth 72 are ground. The arm 14 of the fixture 10 is then returned to its zero position and the surface 75 is ground, utilizing the dial indicator 47 to determine how much metal is to be ground from the surface 75. In this instance, the teeth 71 should be on a radius approximately .015 inch shorter than that of the teeth 70 and 72. Again note that when the arm 14 of my fixture 10 is swung from the position of grinding the bevel surface 73 to that of grinding the bevel 74 and then to the position to grind the surface 75, the teeth 70, 71 and 72 remain at all times in the same relative position in close proximity to the grinding wheel so that the latter need be moved only slightly at any time.

Having disclosed my invention, what I claim as new and desire to secure by Letters Patent is:

1. A fixture for sharpening saw blades comprising a support member, an elongated saw supporting arm, pivot means securing said arm at one end to said support member for a substantial vertical swinging movement of said arm, angle indicating means mounted on said end of said arm and said support member, means releasably securing said arm to said support member against pivotal movement, scroll chuck means, means slidably positioning said scroll chuck means along a longitudinal axis of said arm, means securing said scroll chuck to said arm, blade support means mounted on said arm in proximity of said pivot means for supporting a saw blade adjacent its teeth, blade gripping means mounted at one end to said one end of said support member and the other end engaging said saw blade in proximity of said blade support means, locking means releasably securing said blade gripping means and indexing means mounted adjacent to said blade support means in proximity to said pivot means adapted to engage the teeth of said saw blade and to pivot said elongated arm about said indexing means with the teeth of said saw blade at substantially the center of rotation of said arm.

2. The structure as recited by claim 1 wherein said indexing means comprises a substantially flexible member and stop means mounted on said flexible member having an inclined surface permitting the teeth of said saw to slide past said stop means in one direction and engage said teeth upon rotation of said saw in the opposite direction.

3. The structure as recited by claim 2 taken in combination with dial indicating means and means mounting said dial indicating means on said one end of said arm in alignment with the center of said scroll chuck means for recording the radius of said saw blade.

4. The structure as recited by claim 2 taken in combination with a cap member and means releasably securing said cap member to said scroll chuck means for straightening a warped saw blade positioned on said scroll chuck means.

References Cited
UNITED STATES PATENTS

| | | | |
|---|---|---|---|
| 14,188 | 2/1856 | Ernst | 76—79 X |
| 295,133 | 3/1884 | Tucker | 76—79 X |
| 1,117,575 | 11/1914 | Oatley | 76—42 |
| 1,135,245 | 4/1915 | Zuleg | 76—42 |

GRANVILLE Y. CUSTER, Jr., *Primary Examiner.*